United States Patent

Wirth

[15] 3,673,583

[45] June 27, 1972

[54] RECORDER WITH MEANS TO MOVE THE SPINDLE PERPENDICULAR TO ITS AXIS OF ROTATION

[72] Inventor: Wayne M. Wirth, North Saint Paul, Minn.

[73] Assignee: Minnesota Mining and Manufacturing Company, St. Paul, Minn.

[22] Filed: Aug. 11, 1970

[21] Appl. No.: 62,891

[52] U.S. Cl. ....................340/174.1 C, 274/4 H, 346/74 MD, 346/137

[51] Int. Cl. ....................................G11b 17/02, G11b 21/00

[58] Field of Search ...............340/174.1 C; 346/74 MD, 137; 179/100.2 MI; 274/4 H, 41.4, 12

[56] References Cited

UNITED STATES PATENTS

| | | | |
|---|---|---|---|
| 3,325,603 | 6/1967 | Rabinow et al. | 179/100.41 L |
| 3,423,524 | 1/1969 | Bradford | 179/100.3 |
| 1,746,959 | 2/1930 | Neely | 340/174.1 C |
| 3,261,925 | 6/1966 | Smith | 179/100.41 |
| 2,979,573 | 4/1961 | Kuhn | 179/100.41 |

*Primary Examiner*—Vincent P. Canney
*Attorney*—Kinney, Alexander, Sell, Steldt & Delahunt

[57] ABSTRACT

A disk recorder wherein the disk is supported on a driven spindle and a transducer spaced from the disk surface is moved stepwise generally radially of the disk to record and reproduce information in spaced concentric circular tracks on the disk. The spindle is moved perpendicularly to its axis to either side of a central position whereat the transducer would be stepwise aligned with predetermined concentric circular tracks on the supported disk to adjust the position of the tracks with respect to the transducer.

8 Claims, 3 Drawing Figures

PATENTED JUN 27 1972 3,673,583

INVENTOR.
WAYNE M. WIRTH
BY Kinney, Alexander, Sell, Steldt & De La Hunt
ATTORNEYS

RECORDER WITH MEANS TO MOVE THE SPINDLE PERPENDICULAR TO ITS AXIS OF ROTATION

FIELD OF THE INVENTION

The present invention relates to a disk recorder and in one aspect to a disk-pack track testing device.

BACKGROUND OF THE INVENTION

In disk recorders of the type used in conjunction with computers, the disk support spindle carries several axially spaced information storage disks having magnetizable surfaces, known conjunctively as a disk-pack. While the spindle is rotated at a high velocity, magnetic transducers are moved between the disks stepwise generally radially of the disks, and one transducer "flies" on a cushion of air adjacent each of the exposed faces of the disks to record and/or reproduce information in predetermined, precisely located, spaced concentric circular tracks on the disks. Thus, to maintain the proper relationship between the transducer and the disks in use it is necessary that the disk support spindle be precisely located with respect to the transducers. In the prior art this has been accomplished by supporting the spindle and the transducers on a precision base plate with the spindle supported against movement along or perpendicular to its axis.

While the entire surface of a defect-free disk may be recorded upon, disk-pack recorders in common use utilize only about 50 percent of the recording surface of a disk by recording, for example, 0.007 inch wide tracks on 0.013 inch centers. However, due to manufacturing tolerances, one machine may use a different portion of the recording surface of the disk than a second machine. In manufacturing the disks it is, therefore, necessary to test a larger portion of the disk surface for defects than will be utilized by any particular disk-pack recorder.

Testing of the disks is effected by recording a standard signal on the disks and then reproducing that signal. Any defect will cause a nonstandard signal to be reproduced. To compensate for manufacturing tolerances of machines on which a disk may be used, it is presently necessary to test a disk on three separate test machines: one which is set to record and reproduce information on the disk in the predetermined "normal" tracks specified by the machine manufacturer, one which is set to record and reproduce in tracks a predetermined distance to one side of the "normal" tracks and one which is set to record and reproduce in tracks the same predetermined distance to the other side of the "normal" tracks. This is obviously disadvantageous since it requires three disk-pack recorders and the time necessary to move a disk or a disk-pack to each of the test machines.

THE PRESENT INVENTION

The present invention provides a disk recorder wherein the disk-pack support spindle is moved perpendicularly to its axis to either side of a central portion whereat the predetermined concentric circular tracks are stepwise aligned with the transducer. The spindle movement is controlled to adjust the position of the predetermined tracks on the supported disks with respect to the transducers.

THE DRAWING

Figure 1:
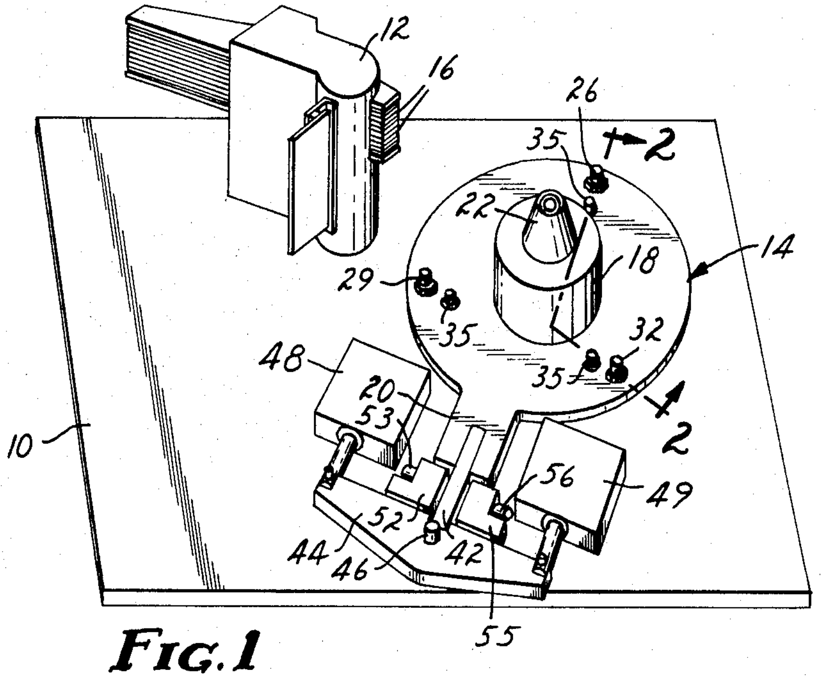
FIG. 1 is a perspective view of a disk recorder constructed in accordance with the present invention.

Referring now to the drawings there is illustrated a disk recorder constructed in accordance with the present invention. A precision base plate 10 provides support and a common precise reference for a transducer support 12 and a spindle support 14.

Figure 3:
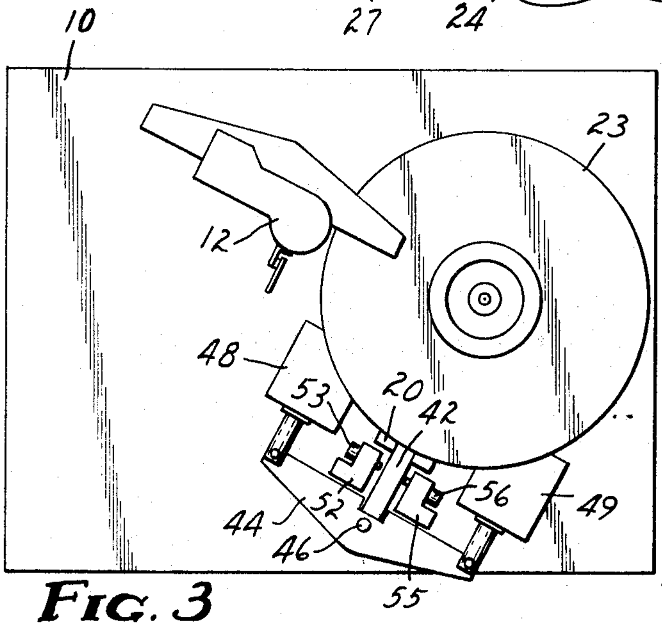
FIG. 3 is a plan view of the disk recorder of FIG. 1 in use.

The spindle support 14 is generally disk shaped with a central cylindrical spindle support hub 18 and a peripheral rectangular extension 20. A disk-pack support spindle 22 of known construction on which a disk-pack 23 (see FIG. 3) may be retained for rotation therewith is journaled in the spindle support hub 18. The spindle support hub 18 and the spindle 22 extend through the disk shaped portion of the spindle support 14 perpendicular to the faces thereof and then through an opening 24 in the precision base plate 10. The lower end (not shown) of the spindle 22 is exposed for driving engagement, for example, by a belt pulley drive.

A plurality of transducers 16 are carried by the transducer support 12. The transducer support 12 is provided with a hydraulic drive and appropriate mechanical linkages (not shown) to move the transducers 16 simultaneously generally radially with respect to the supported disks in discrete equal steps corresponding to the desired spacing of the recording tracks, as is well known in the art. Each transducer 16 is appropriately formed and supported to "fly" on a cushion of air adjacent the surface of a rapidly rotating disk while recording or reproducing information thereon.

Figure 2:
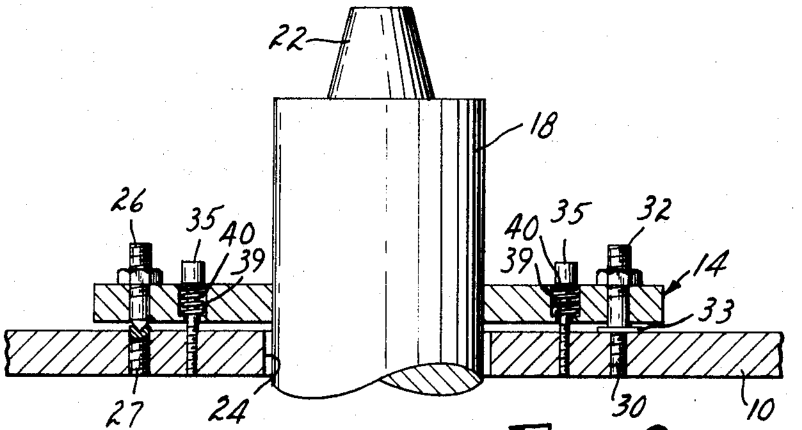
FIG. 2 is a cross sectional view generally along line 2—2 of FIG. 1.

The spindle support 14 is mounted with the faces of its disk shaped portion parallel to the surface of the precision base plate 10 by three studs 26, 29 and 32 threaded through the plate 14. Of these, one stud 26 extends through the spindle support 14 and is formed with a conical end which is received in a conical depression formed in a cooperating stud 27 in the base plate 10. These conically formed studs 26 and 27 define a pivot for the spindle support 14 about an axis parallel to the axis of the spindle 22. The other two studs 29 and 32 extending through the spindle support 14 are formed with flat ends, and there are two corresponding studs 30 (one of which is shown in FIG. 2) in the base plate 10 formed with enlarged flat heads 33 to form bearing surfaces across which the flat ends of the bearing studs 29 and 32 slide as the support spindle 14 is turned on the pivot stud 26 to move the spindle 22 perpendicularly to its axis. Three holddown bolts 35 extend through enlarged openings 36 in the spindle support 14, one adjacent each of the studs 26, 29 and 32 in the spindle support 14. The enlarged openings 36 are counterbored to form recesses 39 in the spindle support 14 to retain a helical compression spring 40 between the head of each holddown bolt 35 and the base of each recess 39. The holddown bolts 35 cooperate with the compression springs 40 to insure contact between the studs 26, 29 and 32 extending through the spindle support 14 and their respective cooperative studs 27 and 30 in the base plate 10. The enlarged openings 36 in the spindle support 14 through which the holddown bolts 35 extend permit sufficient rotation of the spindle support 14 about its pivot stud 26 for the purpose hereinafter described.

The rectangular extension 20 of the spindle support 14 is centrally slotted in alignment with the spindle axis and the support plate pivot stud 26. One end of a rectangular tongue 42 is secured in this slot and the opposite end of the tongue 42 floats in a rectangular recess in one edge of a rocker arm 44. The rocker arm 44 is generally triangular, and a stud 46 extends centrally through it and into the base plate 10 adjacent the floating end of the tongue 42 to define a pivot axis for the rocker arm 44 parallel to the axis of the spindle 22 and the axis of rotation of the spindle support 14. A pair of solenoids 48 and 49 are supported on the base plate 10, one adjacent each end of the rocker arm 44, and the plunger of each solenoid 48 and 49 is secured to the adjacent end of the rocker arm 44. The solenoids 48 and 49 are positioned to act in opposite directions upon activation, thereby providing positive rotation of the rocker arm 44 and the spindle support 14 in either direction about their axes.

A pair of similar stop blocks 52 and 55 are mounted on the base plate 10, one spaced from each side of the tongue 42 between the rectangular extension 20 of the spindle support 14 and the rocker arm 44. Cylindrical stops 53 and 56 are threaded into the stop blocks 52 and 55 respectively, through which each projects to limit movement of the tongue 42 upon actuation of either of the solenoids 48 or 49. The cooperative relationship between the tongue 42 and the stops 53 and 56 provides means for controlling movement of the spindle 22 perpendicularly to its axis.

The stops 53 and 56 are adjusted in their respective blocks 52 and 55 to limit movement of the spindle support 14 to equal predetermined distances to each side of a central position whereat concentric circular tracks would be recorded on disks 23 supported on the spindle 22 if manufacturing tolerances in the machine could be eliminated. Since the stops 53 and 56 are threaded in the stop blocks 52 and 55 they are adjustable to vary the spindle movement and thereby the extent of the surface testing of the disks. Depending upon the adjustment of the stops 53 and 56, the spindle movement may change the position of the disks 23 relative to the transducers 16 only a small fraction of the track width whereby only a limited portion of the disk surface will be tested, or it may change the relative positions nearly a full track width in which case the entire disk surface will be tested.

OPERATION

In use, a disk-pack 23 is locked onto the spindle 22 and the spindle is driven at a high rotational velocity. At the same time one of the solenoids 48 is activated to rotate the rocker arm 44 and the spindle support 14 to move the spindle 22 perpendicularly to its axis until the tongue 42 contacts one of the stops 56. When the spindle 22 and the disk-pack 23 are rotating at their normal operating speed, the transducers 16 are indexed to position one transducer adjacent each of the exposed faces of the disks. With the transducers in position, a test signal is recorded by one of the transducers in a circular test track on one of the disk surfaces, and it is then reproduced and compared with the test signal, Any defect in the disk surface will be indicated by a difference in the signal reproduced from the test signal. Each of the remaining transducers in turn records and reproduces a test signal in a circular test track on its associated disk. When each of the transducers has completed testing one track on its associated disk surface, the transducers are indexed a step generally radially of the disks, and the same testing procedure as followed for the first track is repeated. This procedure is continued until the transducers 16 have made each of their normally prescribed steps generally radially of the disks.

The transducers are then withdrawn to the peripheries of the disks, the activated solenoid 48 is deactivated and the other solenoid 49 is activated to pivot the spindle support 14 to its alternate position. The transducers 16 are then indexed as before through their normal steps, and a new area of each disk is tested by recording and reproducing on different test tracks. Thus, a pair of concentric circular test tracks is recorded and reproduced on a disk for each position of the associated transducer. Since the common track width is 0.007 inch and the common spacing between tracks is 0.006 inch, as long as the spindle support 14 is moved 0.003 inch or less to either side of the central spindle position there will be overlapping of the test tracks. Due to this overlapping of the test tracks, the predetermined "normal" tracks in which information is to be recorded and the adjacent areas in which information may be recorded will be tested. Since manufacturing tolerances are normally small, adequate testing of the disk surfaces is generally provided by limiting the predetermined movement of the spindle 22 to each side of its normal position to about 0.001 inch along the line of transducer movement. However, to give more complete surface testing of the disks, it may be desired to extend the movement of the spindle 22 so that the spindle moves to each side of its normal position 0.0025 inch along the line of movement of the transducers. This will produce almost total surface testing of the disks.

The illustrated apparatus with minor modifications may also be utilized in testing the recording surfaces of optical recording disks. The apparatus may be adapted to align prerecorded tracks with transducers for proper reproduction of the information contained in the tracks. This may, for example, be accomplished by removing the solenoids 48 and 49 and the rocker arm 44 and by replacing the stops 53 and 56 with a rod threaded through the tongue 42 and the stop blocks 52 and 55, supported against axial movement and driven by a motor supported on the base plate 10. Rotation of the threaded rod moves the spindle 22 perpendicularly to its axis to adjust the prerecorded tracks relative to the transducers. To produce a scanning relationship between the transducers and the prerecorded tracks, the motor reverses rotation of the threaded rod after the spindle 22 has been moved a predetermined distance to one side of its central position and it again reverses rotation of the threaded rod after the spindle has been moved a predetermined distance to the other side of its central position. Control of the movement of the spindle 22 is provided by appropriate electrical circuitry which deactivates the motor when alignment of the transducers with the prerecorded tracks is indicated by the strength of the signal reproduced by the transducers or by a special aligning transducer moved with and precisely positioned with respect to the recording and/or reproducing transducers.

I claim:

1. In an apparatus having a driven disk support spindle and a transducer that is moved stepwise generally radially of a disk supported on said spindle to record and/or reproduce information on the disk in predetermined spaced concentric circular tracks, the improvement comprising:

means supporting said spindle for rotation about its axis and for movement perpendicularly to its axis including a spindle support mounted for rotation about an axis parallel to and spaced from the axis of said spindle;

means for rotating said spindle support about its said axis of rotation to move said spindle perpendicularly to its axis to either side of a central position whereat said transducer is stepwise aligned with the predetermined concentric circular tracks on the supported disk; and means for controlling said perpendicular movement of said spindle to adjust the position of the predetermined tracks on the supported disk with respect to said transducer.

2. The apparatus of claim 1 wherein said means for controlling movement of said spindle comprises stop means for limiting movement of said spindle to a predetermined distance to each side of its said central position to define two limiting positions of said spindle and wherein said means for rotating said spindle support comprises means for rotating said spindle support to move said spindle to each of its said limiting positions, whereby upon movement of said spindle to both of its said limiting positions said transducer in a single position may record and/or reproduce information on a said disk in a pair of concentric circular test tracks of differing radii.

3. The apparatus of claim 2 wherein said stop means are positioned to limit movement of said spindle sufficiently to produce overlapping of the pair of concentric circular test tracks.

4. In a disk-pack recording and/or reproducing machine having a driven disk-pack support spindle and a transducer for recording and/or reproducing information in predetermined spaced concentric circular tracks on a disk in a supported disk-pack, the improvement comprising:

means supporting said spindle for rotation about its axis and for movement perpendicularly to its axis including a spindle support mounted for rotation about an axis parallel to and spaced from the axis of said spindle;

means for rotating said spindle support about its said axis of rotation to move said spindle perpendicularly to its axis to each side of a central position whereat said transducer is stepwise aligned with the predetermined concentric circular tracks on the supported disk, and stop means for limiting said perpendicular movement of said spindle to a predetermined distance to each side of its said central position to define two limiting positions of said spindle, whereby upon movement of said spindle to both of its said limiting portions said transducer in a single position may record and/or reproduce information on the disk in a pair of concentric circular test tracks of differing radii.

5. The machine of claim 4 wherein said stop means are positioned to limit movement of said spindle sufficiently to produce overlapping of the pair of concentric circular test tracks.

6. The machine of claim 4 wherein said means for rotating said spindle support comprises:

a rocker arm supported for pivotal movement about an axis parallel to and spaced from the axis of said spindle, a tongue extending between said spindle support and said rocker arm and formed for engagement by said stop means to provide rotation of said spindle support to either of its said limiting positions upon pivotal movement of said rocker arm, and means for pivoting said rocker arm in each rotational direction about its axis.

7. The machine of claim 6 wherein said means for rotating said rocker arm includes a pair of solenoids positioned to pivot said rocker arm in opposite rotational directions about its axis to engage said tongue against said stop means.

8. The machine of claim 6 wherein said stop means comprises a pair of adjustable stops positioned one to each side of said tongue.

* * * * *